No. 890,645. PATENTED JUNE 16, 1908.
W. HAZZARD.
BREAD AND VEGETABLE SLICER.
APPLICATION FILED SEPT. 3, 1907.
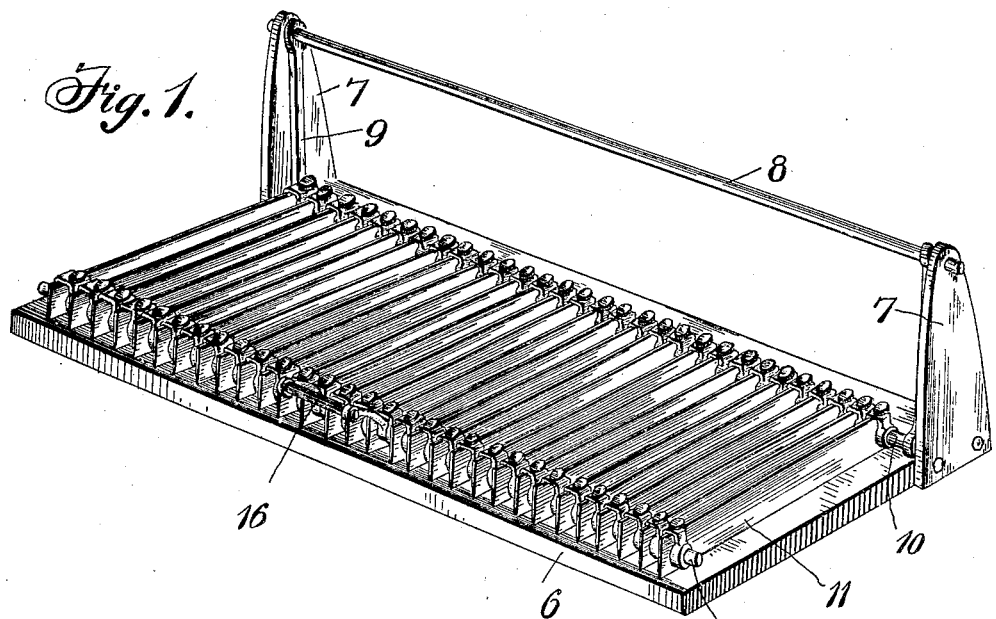
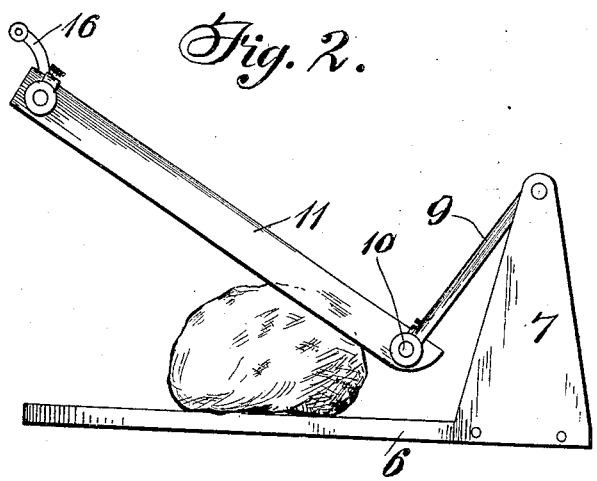 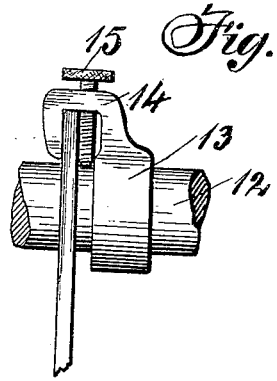
William Hazzard,
Inventor
Witnesses

UNITED STATES PATENT OFFICE.

WILLIAM HAZZARD, OF LORAIN, OHIO.

BREAD AND VEGETABLE SLICER.

No. 890,645.  Specification of Letters Patent.  Patented June 16, 1908.

Application filed September 3, 1907. Serial No. 391,057.

*To all whom it may concern:*

Be it known that I, WILLIAM HAZZARD, citizen of the United States, residing at Lorain, in the county of Lorain and State of Ohio, have invented certain new and useful Improvements in Bread and Vegetable Slicers, of which the following is a specification.

This invention is a bread and vegetable slicer and has for its object to provide an implement for the purpose of simultaneously cutting a considerable number of slices of uniform thickness.

The device is provided with means whereby the thickness of the slices can be adjusted as desired, by moving the knives closer to or farther from each other.

The device also has the advantage that the knives are given a draw cut, or can be swung back and forth after the manner of a hand saw, so that the bread or other substance will not be crushed in the act of cutting.

The invention is illustrated in the accompanying drawing, in which,

Figure 1 is a perspective view thereof. Fig. 2 is an end elevation. Fig. 3 is a detail showing the adjustable clip for fastening the knives.

Referring specifically to the drawings, the cutting board is indicated at 6 and has at each end, at the rear, a standard 7 which supports the cross rod 8 extending therebetween. The knives are swung from this cross rod by means of two links 9, at the ends of the rod, and these links support and are connected to a cross rod 10 which swings above the board and between the standard 7. A series of parallel blades 11 are connected at their rear ends to the cross rod 10, the blades having holes through which the rod extends. At the front end the blades are connected by a cross rod 12 which passes through holes in the ends of the knives. Each knife is fixed to each rod by means of a clip, consisting of a collar 13 having a hook 14 which hooks over the top or back edge of the blade and is fixed by a set screw 15 which extends through the hook and down beside the blade and binds at its point against the rod. The collars are loose on the rod, and by loosening the set screws the clips and knives may be moved laterally to any desired position, to vary the distance between the knives and consequently the width of the slices. A handle 16 is connected to the front rod 12 at or about the middle thereof. This arrangement provides a gang of knives which have free motion to swing back and forth with the links 9 and also to swing up and down with respect to the board.

In use, the material to be sliced is placed on the board, and then by pressing the knives down and swinging the same back and forth it is cut in slices of desired and uniform width. In addition to slicing bread, vegetables and the like the device may be made heavy enough to be used as a meat chopper, and obviously the number of knives may be varied according to the capacity desired.

I claim: —

In a slicer, the combination with front and rear rods, of a plurality of blades having holes in the ends through which the rods extend, and clips comprising collars on the rods having hooks extending over the back of the blades, and set screws bearing against the rods.

In testimony whereof I do affix my signature, in presence of two witnesses.

WILLIAM HAZZARD.

Witnesses:
  G. A. RESEK,
  Mrs. BYRDE KLINGBEIL.